United States Patent [19]

Ollinger et al.

[11] 4,079,563
[45] Mar. 21, 1978

[54] CEILING RUNNER LOCKING MEANS

[75] Inventors: James C. Ollinger, Lancaster, Pa.; James S. Peraro, Columbus, Ohio

[73] Assignee: Armstrong Cork Company, Lancaster, Pa.

[21] Appl. No.: 792,898

[22] Filed: May 2, 1977

[51] Int. Cl.² .......................... E04C 2/42; F16B 7/22
[52] U.S. Cl. ................................... 52/664; 403/230; 403/244
[58] Field of Search ................................. 52/664–668, 52/484, 498, 495, 461; 403/230, 245, 252, 263, 244

[56] References Cited

U.S. PATENT DOCUMENTS

| 1,074,895 | 10/1913 | Rapp | 52/461 |
|---|---|---|---|
| 3,016,997 | 1/1962 | Price | 52/668 |
| 3,067,323 | 12/1962 | Kember | 52/484 |
| 3,633,952 | 7/1970 | Nikolaus | 403/230 |
| 3,798,865 | 3/1974 | Curtis | 52/665 |
| 3,835,614 | 9/1974 | Downing | 52/666 |

FOREIGN PATENT DOCUMENTS

| 736,145 | 6/1966 | Canada | 52/495 |
|---|---|---|---|
| 65,636 | 10/1955 | France | 52/495 |
| 403,258 | 7/1966 | Switzerland | 52/498 |

Primary Examiner—Price C. Faw, Jr.
Assistant Examiner—James L. Ridgill, Jr.

[57] ABSTRACT

The invention is directed to a ceiling runner which has a generally U-shaped configuration. The runner has flanges to support ceiling boards. The side walls of the runner are formed with grooves which may be used to support the runner in position or define an isolated chamber within the body of the runner. The side walls of the runner have a second groove which is used for positioning ceiling boards on the flanges. Locking means are provided on the end and side of two adjacent ceiling runners to lock the ceiling runners together.

1 Claim, 3 Drawing Figures

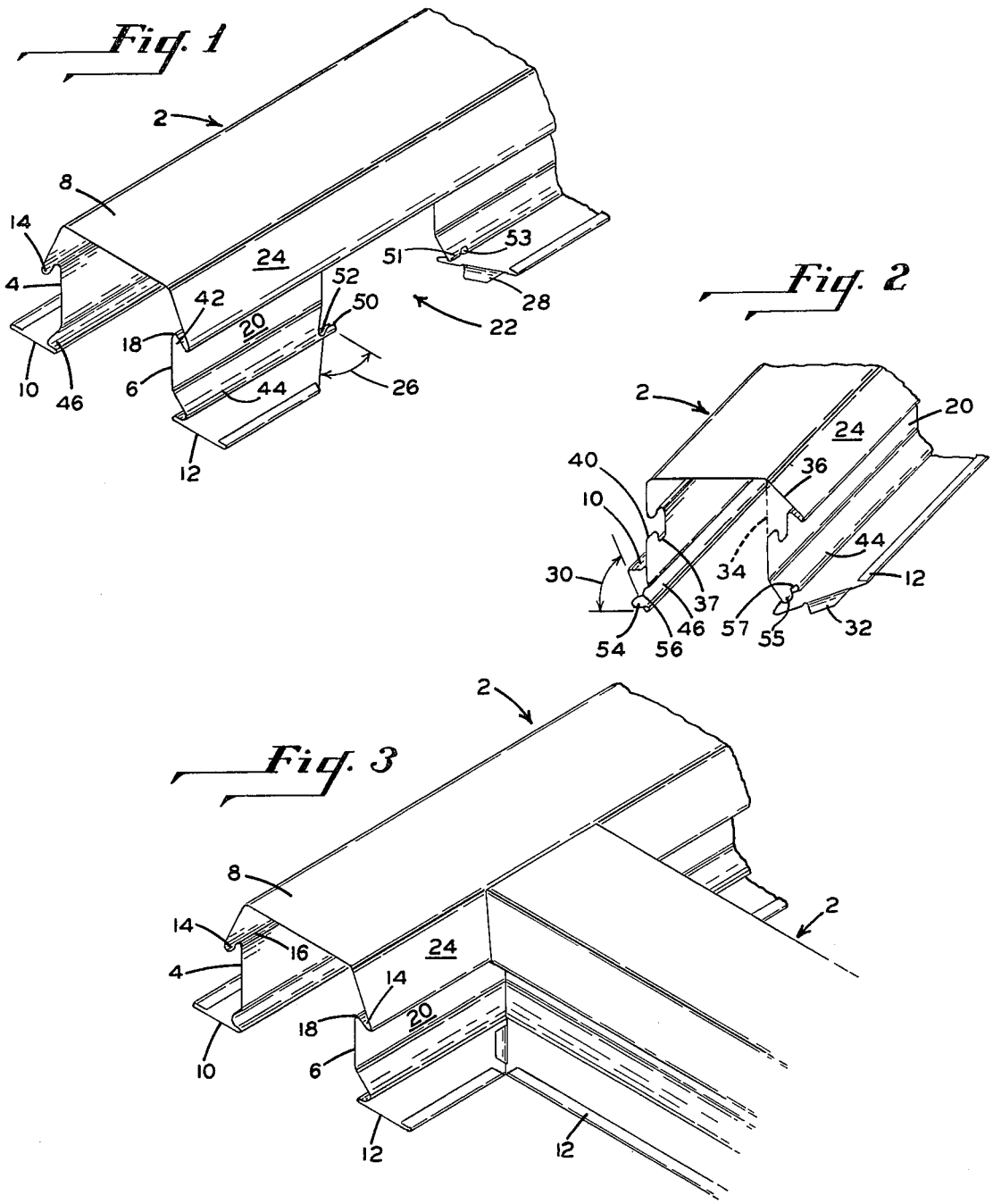

4,079,563

CEILING RUNNER LOCKING MEANS

CROSS-REFERENCE TO RELATED APPLICATION

This application is an improvement over the ceiling runner set forth in U.S. Application Ser. No. 780,418, filed Mar. 23, 1977 in the name of E. B. Nute, Jr., and entitled "CEILING RUNNER".

BACKGROUND OF THE INVENTION

1. Field of the Invention

The invention is directed to a suspended ceiling system and, more particularly, to a runner member of a specific configuration for use in the suspended ceiling system.

2. Description of the Prior Art

U.S. Pat. No. 2,447,694 is directed to a runner structure having a configuration somewhat similar to that of the claimed invention. The runner structure therein is not an exposed grid member in that it cannot be viewed from below a suspended ceiling system, and it functions primarily as a fastening means for another runner in a concealed grid system suspended ceiling.

U.S. Pat. No. 3,067,323 is directed to another runner structure which has a cross-sectional configuration somewhat like the claimed invention. Again, the patented structure differs from the claimed invention primarily in the fact that the patented structure is not formed to be mounted as per the claimed invention, and that the patented structure does not have flanges for supporting a ceiling system.

Finally, U.S. Pat. No. 3,708,932 is directed to a grid member having a structure slightly similar to the claimed invention. The primary difference between the patented structure and the claimed invention is the positioning of the groove structure in the side walls of the runner member.

The claimed invention is a specifically designed runner structure which is meant to carry out specific functions and to be locked together in a specific manner with other runner structures, as will be set forth below.

SUMMARY OF THE INVENTION

The invention herein is a ceiling runner which is to be used in a suspended ceiling system. The runner is of a generally elongated inverted U-shaped configuration. The runner has two partly inclined side walls which are connected together by a flat top member. The runner has horizontal flanges which are used to support ceiling boards. The side walls of the runner have a first groove means therein, and said groove means extend outwardly from the side wall to form two parallel ledges inside of the U-shaped body configuration of the runner. The grooves are positioned about midway of the side walls of the runner. A second groove means is provided in the side walls closely adjacent the horizontal flanges. As part of the second groove means, projections and notches are provided to lock together the end of a runner member which is fastened to the side of an adjacent runner.

BRIEF DESCRIPTION OF THE DRAWING

FIG. 1 is a perspective view of the runner structure having its side arranged to receive the end of another runner structure;

FIG. 2 is a perspective view of an end configuration of a runner structure which is meant to be fastened to the side of the runner structure of FIG. 1; and FIG. 3 is a view of the two runner structures being fastened together with the end of one runner structure engaging the side of another runner structure.

DESCRIPTION OF THE PREFERRED EMBODIMENT

The sheet metal elongated runner structure 2 herein has generally the cross-sectional configuration shown in FIG. 1. The cross-sectional configuration is generally an inverted "U" shape with side walls 4 and 6. The side walls 4 and 6 are connected together by a flat top member 8. Horizontal flanges 10 and 12 extend outwardly from the runner member 2 at the lower ends of the side walls 4 and 6. It is on these flanges 10 and 12 that ceiling boards will be supported. The runner members 2 are arranged in a grid pattern so as to support ceiling boards on the flanges 10 and 12 within the grid pattern.

Each of the side walls has a groove 14 therein at the mid region thereof. The grooves extend outwardly from the side walls to form two parallel ledges 16 and 18 on the inside of the U-shaped body configuration. The grooves 14 extend below and outwardly of these parallel ledges 16 and 18. The grooves, in effect, form an overhang 24 over a portion 20 of the side walls.

The side walls have a cutout 22 therein which is used to receive the end of a runner member 2. The cutout actually exists in the lower portion 20 of the side wall and the flange 12. The upper portion 24 of the side wall 6, which overlies the ledge 18 and actually forms the groove 14, is not cut out. A section of the lower portion 20 of the side wall is removed and the width of the cutout area is equal to the distance between two side walls 4 and 6 measured from opposite portions 20 of each of the side walls. The flange 12 also has a cutout with the flange cut back at a 45° angle, as shown by element 26 of the drawing. On one side of the cutout flange 12 there is provided a tab 28 which extends slightly beyond the end of the flange.

FIG. 1 is a showing of a runner member 2 with the side cut out, but the end configuration in no way altered to engage the cutout 22. FIG. 2 is a view of the end of a runner 20 which has been altered to engage the cutout 22. The runners 10 and 12 have been cut back at an angle of 45°, as shown by element 30. One of the flanges is provided with a tab 32. The lower portion 20 of the side walls 4 and 6 are not cut. However, the upper portion 24 of the side walls 4 and 6 are cut back at an angle from the original edge 34 of the runner 2. The dotted line indicated as element 34 shows the original edge of the runner. An angle of approximately 22° is cut into the upper portion 24 of the side walls so that the edges 36 of the runner 2 will now engage the inclined surface of portion 24 above the cutout 22. In effect, the end of the runner has been configured so that it conforms to the contour of one side wall. In cutting out a portion of the upper portion 24 of the side walls 4 and 6, a notch 37 is provided in the lower portion 20 of the side walls. This notch provides a protrusion or hook element 40 in each side wall which slides under the overhanging groove of the side wall. The protrusion slides up into engagement in recess 42 (FIG. 1) and helps lock the end of the runner member to the side wall of an adjacent runner member. One tab 32 overlies one flange member, and tab 28 goes under another flange member so as to further assist in holding the runner members in position.

The positioning of the two tabs 28 and 32 prevent the relative movement of the flanges 10 and 12 of one runner member adjacent the cutout flange 12 of another member, and thus permit the protrusions 40 to maintain their engagement with recess 42. This locks together the two runner members to help establish the grid system of a suspended ceiling system.

The lower portion 20 of the side walls 4 and 6 are provided with a second groove 46 which faces inwardly of the U-shaped configuration of the runner and forms the stop 44 which extends outwardly from the lower portion 20 of the side walls. The stop 44 is used for positioning ceiling boards as explained in the above-mentioned copending application entitled "CEILING RUNNER".

The improvement of this application over the above-said copending application resides in a locking means which is utilized to further secure together the end of one runner 2 to the side of another runner 2. The locking means is positioned adjacent the second groove 46 which forms the stop 44. Referring now to FIG. 1, when the side wall portion 20 is cut away, on the left side of the cutout a portion of the wall of groove 46 is retained, and on the right side a portion of the groove 46 is also retained. These retained portions of groove 46 form projections 50 and 51. The projection 50 is formed from the lower portion of the wall forming the groove 46, while the projection 51 is formed from part of the upper wall forming groove 46. Adjacent the back side of the projection where it connects to the body of the wall structure there is provided a notch. A notch 52 exists adjacent projection 50, and a notch 53 exists adjacent projection 51.

Now referring to FIG. 2, there will be seen that a similar type structure is maintained on the end of the runner 2. On the left side of the end of the runner a portion of the lower wall forming groove 46 is retained and it forms projection 54. On the right side of the runner 2 a portion of the upper wall forming the groove 46 is retained and it forms projection 55. A notch 56 is provided at the back side of projection 54 and a notch 57 is provided at the back side of projection 55. It should be noted that the right side of the end of the runner of FIG. 2 engages the left side of the cutout of FIG. 1. Consequently, the projection 55 on the end of the runner 2 must be cut from the top portion of the wall forming the groove 46, while the projection 50 of the runner 2 of FIG. 1 must be cut from the bottom portion of the wall forming the groove 46. When the two runner members are placed together, the projection 55 overlies the projection 50, and the notch 57 engages the notch 52 to lock the two members together at that point. Correspondingly, the notch 56 engages the notch 53 with projection 51 overlying projection 54. Due to the existence of the correspondingly positioned projections and the notches at the back edge thereof, the two adjacent runner members are securely locked together.

The runner members are normally painted black on their inside with the flanges painted white and are made from sheet metal. They are bent into the required configuration and suspended from the structural ceiling of a room. Either conventional wire suspension means or special suspension structures may be used to suspend the ceiling runner 2 at a spaced distance from the structural ceiling of a room. A number of runner members are engaged together, with the ends of some of the runner members engaging sides of other runner members to form a grid pattern arrangement of the runner members. Into this grid pattern arrangement, as indicated above, conventional fiber ceiling boards are positioned. All parts of the conventional ceiling system are well known in the art, with the inventive concept herein being the cross-sectional configuration of the runner member and the means utilized to lock the runner members together.

What is claimed is:

1. In a ceiling suspension system comprising at least two runners, each runner having an elongated sheet metal body member and a generally inverted U-shaped configuration, said runner having two side walls connected together at their one ends with a flat top member, the opposite ends of the side walls having horizontal flanges which extend outwardly from the body of the runner to support ceiling boards on either side of the runner, said side walls having a first groove means therein, said first groove means extending outwardly from the side walls to form two parallel ledges inside the U-shaped body configuration, said first groove means extending below and outwardly of the parallel ledges to form an overhang and being in the mid region of the side walls, a second groove means positioned in the side walls closely adjacent the horizontal flanges, said second groove means forming a projection which projects outwardly from the side wall, the end of one runner abutting the side of a second runner, said second runner having its side and adjacent flange partially cut away to form a cutout area, said end of the other runner having a portion of the end cut away to form two hook elements on said side walls, said hook elements engage the side walls of the second runner under the overhang just above the cutout area, the improvement comprising a projection formed on the side of each said second groove means at the end of a runner and at the cutout area of a runner, a notch cut in the back side of each projection, said end of each runner and said cutout area on the side of each runner having the projections and notches so formed that the notches engage each other and the projections overlap each other to lock together the end of one runner to the side of another runner.

* * * * *